United States Patent
Dewaele

(10) Patent No.: US 7,796,839 B2
(45) Date of Patent: Sep. 14, 2010

(54) METHOD OF DETECTING THE ORIENTATION OF AN OBJECT IN AN IMAGE

(75) Inventor: Piet Dewaele, Berchem (BE)

(73) Assignee: Agfa Healthcare, N.V., Mortsel (BE)

(*) Notice: Subject to any disclaimer, the term of this patent is extended or adjusted under 35 U.S.C. 154(b) by 1922 days.

(21) Appl. No.: 10/774,943

(22) Filed: Feb. 9, 2004

(65) Prior Publication Data

US 2004/0161164 A1    Aug. 19, 2004

Related U.S. Application Data

(60) Provisional application No. 60/450,857, filed on Feb. 27, 2003.

(30) Foreign Application Priority Data

Feb. 19, 2003    (EP)    .................................. 03100375

(51) Int. Cl.
G06K 9/32    (2006.01)
G06K 9/36    (2006.01)

(52) U.S. Cl. ........................ 382/296; 382/132; 382/277; 348/95; 358/452

(58) Field of Classification Search .................. 358/1.9, 358/296, 452; 382/132, 269, 276–277, 289, 382/296–297; 348/94, 95
See application file for complete search history.

(56) References Cited

U.S. PATENT DOCUMENTS

| | | | | |
|---|---|---|---|---|
| 3,292,148 A | * | 12/1966 | Giuliano et al. ............. | 382/212 |
| 5,317,652 A | * | 5/1994 | Chatterjee .................... | 382/304 |
| 5,343,390 A | * | 8/1994 | Doi et al. ..................... | 382/132 |
| 5,872,870 A | * | 2/1999 | Michael ....................... | 382/291 |
| 6,011,862 A | * | 1/2000 | Doi et al. ..................... | 382/132 |
| 6,055,326 A | | 4/2000 | Chang et al. | |
| 6,263,097 B1 | * | 7/2001 | Dewaele ...................... | 382/132 |
| 6,658,145 B1 | * | 12/2003 | Silver et al. .................. | 382/149 |
| 7,033,327 B2 | * | 4/2006 | Raby ........................... | 600/590 |
| 7,068,856 B2 | * | 6/2006 | Albertelli et al. ............. | 382/289 |

FOREIGN PATENT DOCUMENTS

EP    1256907 A9 *  11/2002
WO    WO 02/45437 A2    6/2002

OTHER PUBLICATIONS

Y. Kawata et al. ("Curvature based characterization of shape and internal intensity structure for classification of pulmonary nodules using thin-section CT images", SPIE Conference on Image Processing, vol. 3661, pp. 541-552, San Diego, Feb. 1999).*

(Continued)

Primary Examiner—Manav Seth
(74) Attorney, Agent, or Firm—Leydig, Voit & Mayer, Ltd.

(57) ABSTRACT

A method of detecting the orientation of a radiographic image represented by a digital signal representation wherein mathematical moments of the digital signal representation are calculated relative to different reference entities and wherein a decision on the orientation of the radiographic image, for example the position of the thorax edge in a mammographic image, is obtained on the basis of an extreme value (minimum, maximum) of the calculated moments.

20 Claims, 2 Drawing Sheets

OTHER PUBLICATIONS

P. Dewaele, M. Ibison, and P. Vuylsteke ("A Trainable rule-based network for irradiation field recognition in AGFA's ADC system," Proc. of SPIE—vol. 2708, Medical Imaging: Physics of Medical Imaging, R. Van Metter, J. Beutel, Editors, Apr. 1996, pp. 72-84).*

R. Desai and H.D. Cheng ("Pattern recognition by local radial moments," Pattern Recognition, Computer Vision & Image Processing, Proceedings of the 12th IAPR International Conference on vol. 2, No. pp. 168-172, Oct. 9-13, 1994).*

Desai et al., *Pattern Recognition, vol. 2, Conference B: Computer Vision & Image Processing, Proceedings of the 12$^{th}$ IAPR Int'l Conference in Jerusalem*, 168-172 (Oct. 9-13, 1994).

Bankman et al., *Handbook of Medical Imaging*, Ch. 14, 215-230, Academic Press (2000).

Pietka, *Handbook of Medical Imaging*, Ch. 48, 783-801, Academic Press (2000).

Search Report for EP 03 10 0375 (Jul. 25, 2003).

* cited by examiner

METHOD OF DETECTING THE ORIENTATION OF AN OBJECT IN AN IMAGE

This application claims the benefit of and the priority to U.S. Provisional Patent Application No. 60/450,857 filed Feb. 27, 2003, and to European Patent Application No. 03100375.9 filed Feb. 19, 2003, both of which are incorporated by reference.

FIELD OF THE INVENTION

The present invention relates to a method for detecting the orientation of object shapes in radiation images.

BACKGROUND OF THE INVENTION

In radiological practice, it is common to display different exposures pertaining to a patient study in a predefined format. This feature is known as a hanging protocol. In film-based operation, it means that the radiologist or operator hangs the films on the light box in a specific spatial arrangement according to standard or local preferences. Determination of the orientation or reflection of an examination type, or verification of it when it is available, is beneficial to the correct display of many examination types.

In screening mammography standard 4-views of left and right breast are taken for each of the incidence directions (cranio-caudal (CC) and medio-lateral oblique (MLO)). These views are typically displayed in a mirrored fashion, such that the thorax edges or both breasts are central and touching, and the left breast image being displayed on the right and the right breast image being displayed on the left. However, because both breasts images are acquired in a similar manner, and it is in general not known which image is either corresponding to the left or the right breast, one image must be flipped before it can be positioned adjacent to the other image. In conventional screen-film imaging, X-ray opaque lead letters are radiographed simultaneously (RCC, LCC, RMLO and LMLO) with the object, and the RCC resp. RMLO films are flipped manually prior to hanging them on the right of the LCC resp. LMLO on the light box.

Digitally acquired mammograms may still be read in a conventional way by printing them on film and displaying them on a light box. Pairs of mammograms (e.g. the RCC/LCC pair and the RMLO/LMLO pair) may be printed on a single large film sheet or on two smaller sized sheets. Generally, the print margin of a hardcopy machine is adjustable, so as to minimize the non-printed portion of an image. For mammography hardcopy, the print margin corresponding to the thorax side is kept as small as possible, so that a right-left pair of images, when viewed simultaneous and in close vicinity, shows a minimal non-diagnostic viewing area in between both images. Therefore, when using a pair of small sheets to print left and right image respectively, means to identify the thorax side automatically prior to printing them is needed, because the thorax side position is generally not known or it may not be assumed to be known. Likewise, in the large film option, where both images are printed on one file sheet in order to compose the image such that the right image is touching in a mirroring manner to the left image, knowledge of the thorax side of both images is needed as well.

Digital mammography may be read on a computer display or viewing station without having resort to printed mammograms, a viewing condition known as softcopy reading. However, also here, the sub-examination types identifying right and left images may not be known at display time. Furthermore, the thorax edge orientation may not be standardized, e.g. it may either touch the left or right or the upper or lower image border. Hence, there is a need to accomplish the mirrored viewing disposition in an automated way.

Generally, a hanging protocol function enables users to arrange and display images on medical viewing stations to suit specific viewing preferences. To this purpose, the sub-examination is used to assign the sub-images pertaining to a patient study of a body part to a position in a preferred display layout of that examination type. When the image sub-type is known, hence its position in the layout is determined, the image can still be oriented in 8 different ways: it can be oriented correctly, or it can be rotated of 90, 180 or 270 degrees; in any of these four cases, the image can also be flipped around a vertical (or horizontal axis). Therefore, there is a need to derive the orientation of the image automatically, to assure viewing according to the radiological standard or local preferences.

WO 02/45437 discloses a method of determining orientations of digitized radiographic images such as mammographic images from marker images (e.g. lead marker images). The digitized radiographic images are then displayed in a predetermined orientation and order.

In the article "Two dimensional shape and texture qunatification', Bankman I., Spisz T. S., Pavlopoulos S., Handbook of Medical Imaging, Chapter 14, pages 215-230, XP002249040, Bankman Isaac N., editor, Academic Press, 2000, a method has been described for defining the orientation of an object in an image. More particularly the direction along which an object is most elongated relative to a preferential direction such as a vertical axis is determined by calculating an angle θ in the calculation of which mathematical moment is used.

SUMMARY OF THE INVENTION

The above-mentioned objects are achieved by a method of detecting the orientation of a radiographic image represented by a digital signal representation as set out in claim 1.

To detect the orientation of a radiographic image mathematical moments are calculated relative to different reference entities (axes, points . . . ) and the orientation is derived from an extreme value of these mathematical moments. By the term extreme value is meant maximum or minimum value, depending on the sign of the power of the spatial coordinate function in the calculated moment as will be explained further on.

In the context of the present invention the term orientation of an image can be defined on the basis of the image content. For example with regard to mammographic images the orientation of an image can be defined in terms of the position of the thorax edge or the position of nipple relative to one of the image borders.

According to the present invention the orientation of a radiographic image represented by a digital signal representation such as a function $f(x,y)$ is derived from the result of a calculation of at least one mathematical moment of the function $f(x,y)$.

Another aspect of the present invention relates to a method of orienting an image into a predefined orientation. The method in general comprises the steps of (1) deriving the actual orientation of the image from its digital representation and (2) manipulating the image (e.g. by rotating, mirroring etc.) so that the envisioned orientation is obtained.

For the application of orienting an image into a predefined orientation, a geometric transformation can be applied to the image. The geometric transformation is determined by the geometric parameters of the actual orientation and the envisioned orientation. Techniques known in the prior art for determining the geometric displacement field and the intensity interpolation can be used to geometrically modify the image to the envisioned target orientation.

Specific features for preferred embodiments of the invention are set out in the dependent claims.

Further advantages and embodiments of the present invention will become apparent from the following description and accompanying drawings.

A specific aspect of the present invention relates to a computer program product adapted to carry out the method as set out in the claims when run on a computer.

Another specific aspect relates to a computer readable medium such as a CR-ROM comprising computer executable program code adapted to carry out the method set out in the claims.

The method of the current invention is particularly suited in the field of digital mammography, to detect the thorax to nipple direction and further to align a left-right pair of breast views such that their thorax sides are touching when printed on film or displayed on screen.

The invention is however not limited to this application.

DETAILED DESCRIPTION OF THE INVENTION

Figure 1:
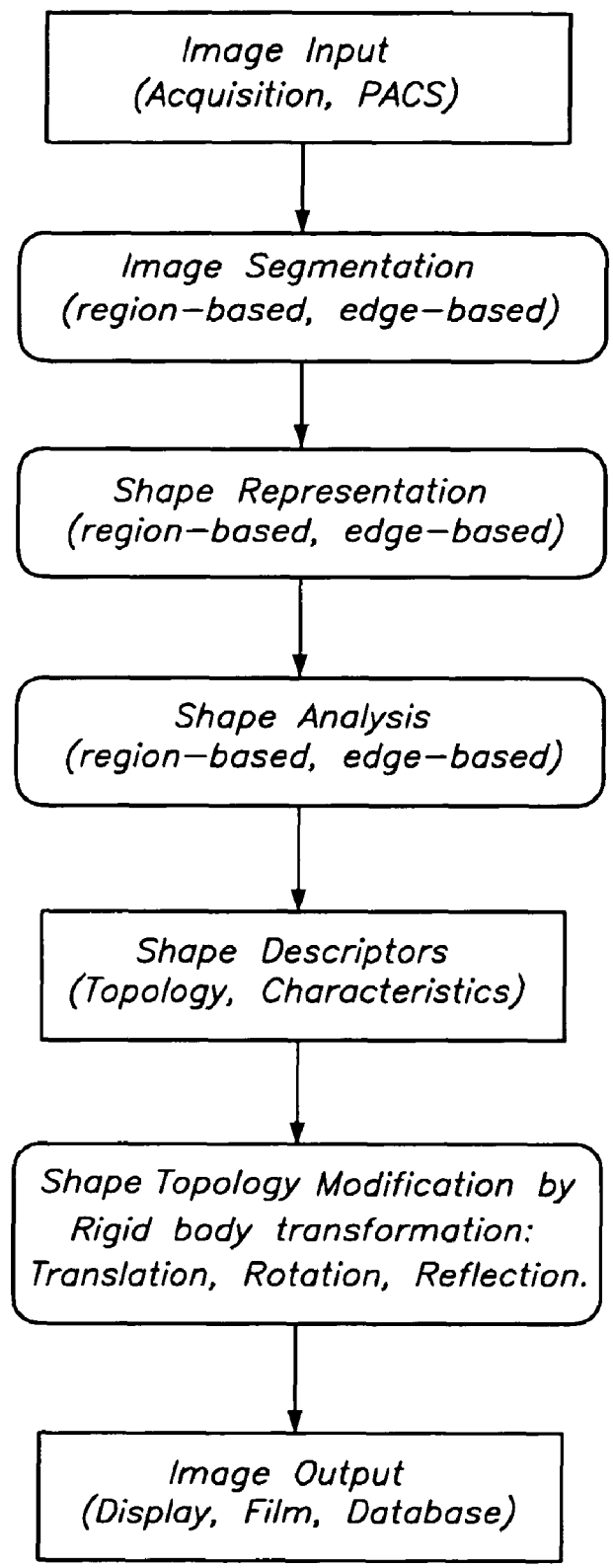
FIG. 1 is a flow chart illustrating a method to manipulate a radiation image according to the shape of objects in the diagnostic region(s) of the image.

A general overview of a method to manipulate a radiation image according to the shape of objects in the diagnostic region(s) of the image is given in FIG. 1.

Image Input:

In order to conduct a topological analysis of the mammography image to infer the position of the breast's thorax side and the orientation of the nipple, shape analysis is performed.

Shape analysis is generally carried out starting from an intermediate representation of an image typically involving the segmented image and/or special shape descriptors.

A radiation image typically consist of three different areas:

The diagnostic area comprises pixels corresponding to patient anatomy. In general, the outline of this imaged area may take any shape.

The direct exposure area is the image region that has received un-attenuated radiation. Although this region has constant intensity corrupted by noise only, inhomogenities in incident energy (e.g. X-ray source Heel effect) and receptor (e.g. varying storage phosphor sensitivity in computed radiography) may distort this pattern. In European patent application 1 256 907 a method is disclosed to estimate these global inhomogenities retrospectively from the diagnostic image and flatten the response in all image parts in accordance with an extrapolated background signal.

The collimated areas appear on the image as highly attenuated pixels. The shape of these areas typically is rectilinear, but circular or curved collimation shapes may be applied as well.

Three different area transition types may be considered in a radiation image: diagnostic/direct exposure, diagnostic/collimated area, and direct exposure/collimated area boundaries.

Image Segmentation:

Segmentation algorithms aim at detecting and separating of the set of pixels that constitute the object(s) under analysis. These techniques may be broadly classified according to the type of processing applied to the image. Region-based algorithms group pixels in the image according to suitable similarity criteria. In European patent application EP 887 769 a region-based algorithm is disclosed to segment direct exposure areas by grouping pixels according to centroid clustering of the gray value histogram. Edge based algorithms separate image pixels in high contrast regions in the image according to gray value differences of neighboring regions. In European patent application 610 605 and European patent application 742 536 an edge-based algorithm is disclosed to detect and delineate the boundaries between collimated areas and diagnostic areas on a single or multiply exposed image. Either in region-based and edge-based approaches, models may be used to restrict the appearance or shape of the segmented image areas to obey predefined photometric or geometric constraints. An example of this paradigm are the so-called Active Appearance and Active Shape Models (AAM and ASM).

Shape Analysis:

As a consequence of the segmentation result being either a region or a region transition, shape analysis techniques may also be divided roughly in either region-based or edge based procedures. Shape analysis techniques generally depart from a suitable representation of regions and region boundary, and hence they may also broadly be divided in region-based and contour-based classes. Examples of representations of either type are given in the sequel.

Shape analysis techniques are typically selected in view of the problem requirements. These requirements will broadly fall in one of two classes. The first class may be termed topology problems, in that the problem is one of locating and substantiating the specific spatial arrangement of an object shape with respect to other objects or reference systems. The second class may be termed characterization, and is closely linked with classification. In this problem class, shape specific descriptors must be applied, and in general a topology-independent characterization is needed. Both problem classes are closely linked, because when the topology of a specific shape needs be calculated, the shape must first be searched for and detected on the basis of the shape's specific characteristics. Conversely, when the characteristics of a specific shape need be determined e.g. in order to classify it, the shape must first be located in the image, which problem component is one of topology. Given the topology and characteristics of the shape, the application specific problem can be solved.

Shape Description:

The result of a shape analysis is a set of shape descriptors that characterise either the topology, the specific shape features or both.

In order to determine the orientation of an object in a medical image, e.g. the thorax side of the breast mass, shape analysis techniques are used to describe the topology and characteristics of the object in the image. The shape of an object determines the extent of the object in the image, which is a binary image, and the spatial distribution of gray levels inside the object's extent. A shape analysis therefore departs from a shape representation, from which shape descriptors are calculated. Shape representation methods result in a non-numeric representation of the original shape capturing the important characteristics of the shape (importance depending on the application). Shape description methods refer to methods that result in a numeric descriptor of the shape, generated by calculating a shape descriptor vector (also called a feature vector). The goal of description is to uniquely characterise the shape using its descriptor vector, independent of the shape's position, orientation and size. Conversely, the process of reduction of a shape to its canonical form that is invariant to translation, rotation and scale, assumes that the actual shape's position, orientation and size are determined.

In order to be able to align the breast's shape with the correct associated image border, it must be determined with which image border(s) the breast as a whole is aligned.

In the context of digital mammography, the input to the shape analysis problem as outlined before, is either a binary representation of the extent of the breast's shape, or a discretely distributed mass representation, in which each pixel is attached a mass in the pixel's center, the magnitude of the mass being equal to its gray value. The segmentation procedure can be performed by prior art techniques and either outputs a binary image, representing the silhouette of the breast, or the contour outline, representing the location of the breast's transition to the direct exposure region. Such prior art techniques are based on thresholding (such as a technique disclosed in European patent application EP 887 769) or region growing.

Although they are area measures, gray value distribution measures such as histogram-based statistics (called first order statistics) or local texture measures (called second and higher-order statistics such as co-occurrence measures) are insufficient to characterize the global spatial distribution of the anatomy in the radiographic image. Histogram measures are inadequate because the spatial information is lost. Texture measures based on co-occurrence measures are suitable for description of local gray value appearance within the breast mass, but the characterization step must be followed by a texture segmentation to provide the location of the breast tissue in a mammogram. As the appearance of breast tissue may be very diverse, multiple measures will be needed to characterize the full spectrum of breast appearance. Hence, these prior art methods are therefore inadequate to describe shape orientation adequately. Therefore, spatial analysis of the breast region by the general method of moments will be considered in the first part. Equivalently, the spatial distribution of the breast mass, represented and described by the breast-direct exposure region boundary, is addressed in the second part. Hybrid methods combining both region and contour analysis may be considered also.

Two basic approaches for constructing shape orientation measures have been implemented in the context of the present invention.

Region-Based Shape Orientation Measures

Region Representation

In its simplest form, a region may be viewed as a grouping or collection of pixels belonging to an entity having a problem-specific semantic (e.g. all pixels belonging to an object part). At a higher level of abstraction, a region may be described by its decomposition in smaller primitive forms (such as polygons, or quadtrees). A region may also be described by its bounding region such as the Feret box, the minimum enclosing rectangle or the convex hull. Finally, a region may be represented by its internal features such as its skeleton, or a run-length representation.

Cartesian Moments

The two-dimensional Cartesian moment $m_{pq}$ of order $p+q$ of a digital image $f(x,y)$ is defined as $$m_{pq} = \sum_x \sum_y x^p y^q f(x, y).$$

The origin with respect to which x and y are defined is important. In the context of the present invention, the x and y coordinate axes of a right-handed coordinate system, attached to the upper left pixel of the image, are defined to coincide with the leftmost column and uppermost row of the image respectively.

Moment-based shape description is information-preserving, in that the moments $m_{pq}$ are uniquely determined by the function $f(x,y)$ and vice versa the moments $m_{pq}$ are sufficient to accurately reconstruct the original function $f(x,y)$.

The zero$^{th}$ order moment $m_{00}$ is equal to the shape area, assuming that $f(x,y)$ represents a binary-valued silhouette segmentation with value 1 within the shape (i.c. the breast) and value 0 outside the shape (i.c. the direct exposure region). When $f(x,y)$ represents the original gray value image, $m_{00}$ equals the sum of gray values in the image. Alternatively, $f(x,y)$ may also represent derivatives of the gray value function (e.g. first order edge gradient), so that e.g. high gradient areas contribute more than constant gray value areas.

First-order and higher order moments weight the silhouette function or gray value function by the spatial coordinate. Hence, they are useful descriptors to describe the spatial distribution of mass inside the shape. For positive values of p or q, pixels with larger x or y coordinate with respect to their reference origin are weighted more than pixels with smaller coordinate value. Conversely, for negative values of p or q, pixels nearer to the x or y reference axis respectively have higher contribution to the moment value. Moments with p<0 or q<0 are called inverse moments. The magnitude (|p| or |q|) controls the rate with which the influence of pixels farther away from their origin or their respective coordinate axes increases or decreases.

The summation area in computing the moment sums may be confined to one or more image regions obtained by segmentation. However, the segmentation may be implicit in that pixels with low gray value $f(x,y)$ have less influence and hence are implicitly ignored in the moment sum. This implicit segmentation of direct exposure area may be used in the task of detecting the thorax side in mammograms in that pixels of the direct exposure area have low gray value; hence their contribution to the moment sum is negligible compared to the contribution of the breast mass pixels. The moment $m_{pq}$ may therefore be obtained by including all image pixels in the sum, without explicitly segmenting the breast mass.

Moments of Projections

Two-dimensional or area-based moments may be reduced to one-dimensional moments by projecting the gray value image onto one axis. The moments of the projection are one-dimensional moments of the projection function. The projection direction may for example be parallel to the coordinate axes (e.i. integrated in columns, which is projection parallel to the x-axis, or integrated in rows, which is projection parallel to the y-axis), reducing the general moment equation to $$m_p = \sum_x \sum_y x^p f(x, y),$$

$$m_q = \sum_x \sum_y y^q f(x, y),$$

For p>0 and q>0, this descriptor has small values in cases where the largest gray values are concentrated along or nearby the x-axis resp. the y-axis. The opposite effect can be achieved using negative p or q, yielding the so-called inverse moments. Pixels for which x=0, or y=0 are excluded from the summation when computing inverse moments.

The breast mass shape in a RCC or LCC view for example may approximately be described by a circle halve, touching an image border along its chord. Consequently, when the gray value mass pertaining to the breast shape is nearby the image border corresponding to the x-axis, the associated inverse moment will have higher values than the inverse moment with respect to the parallel juxtaposed image border, or with respect to any of the two remaining perpendicular borders corresponding to the y-axis direction.

radial (e.i. the image is integrated on concentric circles, yielding the radius as the independent variable).

$$m_s = \sum_x \sum_y r^s f(x, y), \quad r = \sqrt{x^2 + y^2}$$

This descriptor has small values in cases where the largest gray value pixels are along or nearby the origin of the coordinate system. The opposite effect can be achieved using negative values for s. The pixel at the origin for which r=0 must be excluded in the summation for the inverse moment.

parallel to other axes, e.g. parallel to the main diagonal $$m_k = \sum_x \sum_y (x - y)^k f(x, y),$$

This descriptor has small values in cases where the largest gray value pixels are along or nearby the principal diagonal. The opposite effect can be achieved using the inverse moment $$m_{-k} = \sum_x \sum_y \frac{f(x, y)}{(x - y)^k}, \quad x \neq y$$

Instead of being computed with respect to axes related to the Cartesian image coordinate system, they may be computed with respect to axes intrinsic to the object, such as principal axes with respect to which there are minimum and maximum second-order moments.

Figure 2:
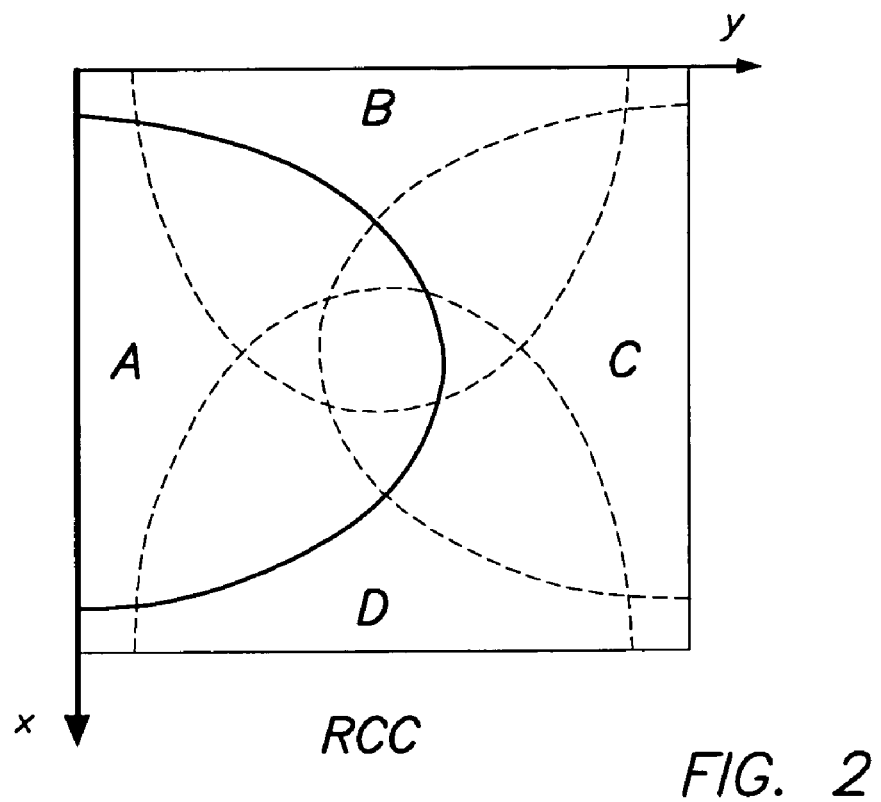
FIG. 2 illustrates the method of determining the orientation of the breast mass in CC views.

Examples of determining the orientation of the breast mass in CC views are illustrated in FIG. 2, where a homogeneous mass distribution inside the shape is assumed.

A.

$$m_q = \sum_x \sum_y y^q f(x, y)$$

is minimal if q>0 and the object is situated close the x-axis or maximal if q<0 and the object is like-wise situated close to the x-axis.

B.

$$m_p = \sum_x \sum_y x^p f(x, y)$$

is minimal if p>0 and the object is situated close to the y-axis or maximal if p<0 and the object is like-wise situated close to the y-axis.

C.

$$m'_q = \sum_x \sum_y (c - y)^q f(x, y)$$

wherein c represents the number of columns is minimal if q>0 and the object is situated nearby the juxtaposed image border parallel to the x-axis and maximal if the object is like-wise situated nearby the juxtaposed image border parallel to the x-axis but q<0. This situation is obtained e.g. by reflecting (flipping) the image of configuration A around the image-centred vertical, or by rotating 180 degrees the image of configuration A around the image centre.

D.

$$m'_p = \sum_x \sum_y (r - x)^p f(x, y)$$

with r representing the number of rows is minimal if p>0 and the object is situated nearby the juxtaposed image border parallel to the y-axis and maximal if the object is situated nearby the juxtaposed image border parallel to the y-axis but p<0. This situation is obtained e.g. by reflecting (flipping) the image of configuration B around the image-centred horizontal, or by rotating 180 degrees the image of configuration B around the image centre.

Moments with Respect to Points

Moments can be expressed to points whereby the gray value (or binary quantized value) is weighted with distance to a point. In contrast to the general moment generating function where x and y coordinates are separated, the topology information x and y may be combined in a single geometric measure, which can for example be distance to a given point, raised to a suitable power. The moment generating function then becomes a radial projection, with lines of equal contribution (for a constant gray value) being concentric circles around the given point $(x_i, y_i)$.

$$m_s = \sum_x \sum_y r^s f(x, y), \quad r = \sqrt{(x - x_i)^2 + (y - y_i)^2}$$

Several anchor points $(x_i, y_i)$, i=1 ... N may thus be considered and the resulting image moments may be compared with respect to each other, to determine the anchor point around which the gray value mass topologically is most concentrated. By suitably choosing the set of anchor points, a topological analysis of the image may be conducted in view of the problem, which is one of orientation detection.

The loci of equal geometrical contribution (considering the gray value constant) to any pair of points of the set $(x_i, y_i)$, i= 1 ... N is given by the set of intersection of corresponding circles (with equal radius) around each of the two points of the pair. These loci form a straight line, called the perpendicular bisector. For each pixel in the half plane of the line, the distance to the representative point in its associated half plane of the line is smaller than the distance to the point in the other half plane. Considering now a triple of points, forming a triangle, the perpendicular bisectors may be drawn in between any two vertices of the triple, and it is a known property of planar geometry that these bisectors meet in a common point. The complete set of points $(x_i,y_i)$, $i=1 \ldots N$ may be tessellated in a group of contiguous triangles, none of them overlapping and the ensemble of which covers the plane (or part of the plane) completely. This procedure is called triangulation. The process of bisecting may now be performed on any of the constituent triangles, and the result of this operation is a minimum-distance tessellation of the plane into polygonally shaped cells $C_i$, the ensemble being called a Voronoi diagram. Each cell contains exactly one representative of the original set of points $(x_i,y_i)$, $i=1 \ldots N$. This diagram has the property that the distance of a point in a certain cell is nearer to the representative point of this cell than to any other point of the original point set. Each cell thus represents the locus of proximity of pixels $(x,y)$ in the plane w.r.t. the set of points $(x_i,y_i)$, $i=1 \ldots N$.

The choice of points in the point set $(x_i,y_i)$, $i=1 \ldots N$ is imposed by the problem at hand. For mammography orientation detection, suitable points are the midpoint of the thorax breast side of the CC view, which may be seen to coincide approximately with midpoint of the associated image border. For the MLO view, the breast is diagonally spread out between the compressor plates, Therefore, in contrast to the CC view; there is also image information in one of the four image corners. Hence, image corner points are suitable anchor points also. Depending on the subset taken from the combined set of 4 border midpoints and 4 corner points, different Voronoi tessellations are obtained, each of which having interesting topological properties.

Each of the Voronoi cells $C_i$ in a Voronoi tessellation represents an image area, all pixels of which are topologically closer to point $(x_i,y_i)$ than to any other point in the point set $(x_i,y_i)$, $i=1 \ldots N$. Moments of the type $m_s$ may now be computed to measure the distribution of the gray values of pixels inside the cell $C_i$ to its representative cell point $(x_i,y_i)$. When larger gray values are located farther from $(x_i,y_i)$, moments with positive values for s will be larger than moments of a distribution where pixels with larger gray values are nearer to $(x_i,y_i)$. The reverse holds for inverse moments obtained by negative values for s in that they measure concentration of gray value mass around $(x_i,y_i)$. In spite of its simplicity, the zero-order moment $m_{s=0}$ is also particularly useful. Since it is the sum of gray values inside the Voronoi cell, the ensemble $m_0(i)$ of all Voronoi cells is representative for the topological distribution of gray value mass in the image. When the image is binarized, this zero-order moment is representative for the topological distribution of the image object, for it measures the image area of the image object contained in each Voronoi cell. The usefulness of zero-order moment of binary images may further be normalized by computing the measure $m_0(i)/A(i)$, where $A(i)$ represents the area of the Voronoi cell $C_i$. This fractional measure represents the fill factor of cell $C_i$; hence it measures how an object is topologically distributed in the image plane. A weight may further be attached to each cell moment, e.g. the reciprocal of the cell's relative area (relative to the total image area), to obtain equal importance of each cell in comparison between cells, irrespective of their absolute size.

Minimum distance tessellations may be constructed for other geometrical objects, such as lines, in a similar way.

Figure 3:
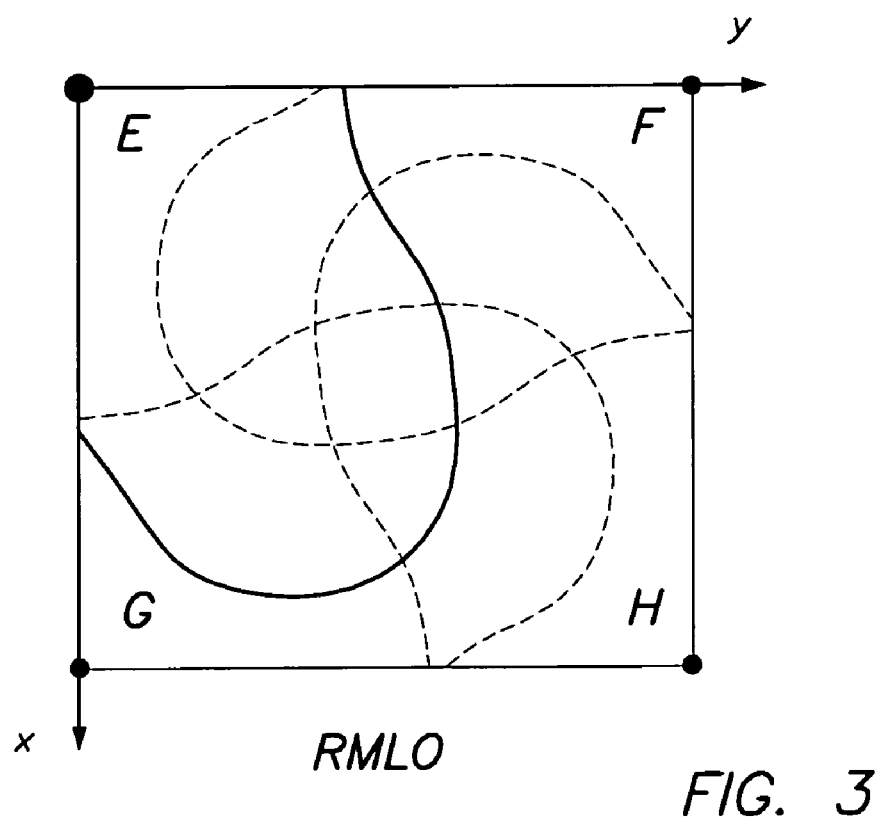
FIG. 3 illustrates the method of determining the orientation of the breast mass in MLO views.

Examples of determining the orientation of the breast mass in MLO views is given in FIG. 3.

E. $m_s$ with $(x_i,y_i)=(0,0)$ is minimal if $s>0$ and the object is situated close to the upper-left image corner or maximal if $s<0$ and the object is like-wise situated close to the upper-left image corner.

F. $m_s$ with $(x_i,y_i)=(0,c)$ wherein c represents the number of columns is minimal if $s>0$ and the object is situated close to the upper-right image corner or maximal if $s<0$ and the object is like-wise situated close to upper-right corner.

G. $m_s$ with $(x_i,y_i)=(r,0)$ wherein r represents the number of rows is minimal if $s>0$ and the object is situated close to the lower-left image corner and maximal if the object is like-wise situated close to the lower-left image corner but $s<0$ H. $m_s$ with $(x_i,y_i)=(r,c)$ is minimal if $s>0$ and the object is situated close to the lower-right image corner and maximal if the object is like-wise situated close to the lower-right image corner but $s<0$.

Curve-Based Shape Orientation Measures

Curve Representation

A curve or contour may in its simplest form be represented by the set of (possibly chained) contour pixels. At a higher level, the curve may be approximated in primitive forms such as a collection of approximating line segments (a polygonal representation, alternatively represented by the corner intersections), circle arcs, elliptical arcs, syntactic primitives, B-splines, Snakes and active contours, or multiscale primitives. Finally, a curve may be represented parametrically, for example as a two-component vector $\gamma(t)=\{x(t),y(t)\}$ for a plane curve, or as a complex signal $u(t)=x(t)+jy(t)$, a chain code or a run-length code.

Moment Measures Based on Boundaries of Binary Silhouettes

For binary silhouette images, moment measures based on the contour of the binary object are essential equivalent to moments computed from the interior of the shape (the occupancy array). The number of boundary pixels is generally proportional to the square root of the total number of pixels inside the shape. Therefore, representing a shape by its boundary is more efficient than representing the shape with an occupancy array. This advantage of faster computation becomes even greater when the shape is polygonal, or with many straight segments along its boundary. The moments with respect to a reference point may then be computed by summing the moments of triangles formed by the two neighbouring corner points spanning a line segment of the 2D polygonal (or polygonal approximated) shape and the reference point. The moments with respect to a (in general arbitrarily oriented) reference line are computable as the sum of moments of trapezoids formed by the two corner points spanning the line segment of the 2D shape and the normal projections of those points on the reference line. Said elementary moments based on a triangle and a trapezoid will only depend on the vertex coordinates.

Extension to 3D Object Orientation Detection

It will be clear that moments in 3 dimensions can be used to determine the 3D orientation of a 3D object in a 3D medical image. In this respect specialisations of the 3D moment generating function may be generated by projecting the 3D medical image onto planes or lines or by considering radial projection around points.

What is claimed is:

1. A method of detecting the orientation of a radiographic image represented by a digital signal representation comprising:
   calculating, via a medical computer system, mathematical moments of said digital signal representation relative to different reference entities; and
   obtaining, via the medical computer system, a decision on the orientation of said radiographic image on the basis of an extreme value comprising one of a maximum and a minimum of the calculated moments, wherein said moments are one-dimensional moments obtained by projecting the digital signal representation of said image onto a predefined axis.

2. The method according to claim 1 wherein said axis is parallel to one of the boundaries of said image.

3. A method of detecting the orientation of a radiographic image represented by a digital signal representation comprising:
   calculating, via a medical computer system, mathematical moments of said digital signal representation relative to different reference entities; and
   obtaining, via the medical computer system, a decision on the orientation of said radiographic image on the basis of an extreme value comprising one of a maximum and a minimum of the calculated moments, wherein said digital signal representation is a function of at least one derivative of an original digital signal representation.

4. The method according to claim 3 wherein said derivative is the first order edge gradient.

5. A method of detecting the orientation of a radiographic image represented by a digital signal representation comprising:
   calculating, via a medical computer system, mathematical moments of said digital signal representation relative to different reference entities; and
   obtaining, via the medical computer system, a decision on the orientation of said radiographic image on the basis of an extreme value comprising one of a maximum and a minimum of the calculated moments, wherein collimation area are excluded from said digital signal representation.

6. A method of detecting the orientation of a radiographic image represented by a digital signal representation comprising:
   calculating, via a medical computer system, mathematical moments of said digital signal representation relative to different reference entities; and
   obtaining, via the medical computer system, a decision on the orientation of said radiographic image on the basis of an extreme value comprising one of a maximum and a minimum of the calculated moments, wherein direct exposure area are excluded from said digital signal representation.

7. The method according to claim 6 wherein a moment is a cartesian moment which moment weights the digital signal representation by a function of at least one spatial coordinate x or y.

8. The method according to claim 7 wherein a moment is calculated with respect to a cartesian co-ordinate system the axes of which are substantially parallel to the boundaries of said image.

9. The method according to claim 6 wherein said moments are two-dimensional moments.

10. The method according to claim 6 wherein a moment is generated with respect to at least one predefined point.

11. A non-transitory computer readable medium comprising computer executable program code adapted to carry out the steps of claim 7.

12. A non-transitory computer readable medium comprising computer executable program code adapted to carry out the steps of claim 8.

13. A non-transitory computer readable medium comprising computer executable program code adapted to carry out the steps of claim 9.

14. A non-transitory computer readable medium comprising computer executable program code adapted to carry out the steps of claim 1.

15. A non-transitory computer readable medium comprising computer executable program code adapted to carry out the steps of claim 2.

16. A non-transitory computer readable medium comprising computer executable program code adapted to carry out the steps of claim 10.

17. A non-transitory computer readable medium comprising computer executable program code adapted to carry out the steps of claim 3.

18. A non-transitory computer readable medium comprising computer executable program code adapted to carry out the steps of claim 4.

19. A non-transitory computer readable medium comprising computer executable program code adapted to carry out the steps of claim 5.

20. A non-transitory computer readable medium comprising computer executable program code adapted to carry out the steps of claim 6.

* * * * *